Jan. 28, 1969  H. HARRISON  3,424,483
ROTATABLE ELEMENT

Filed Oct. 7, 1965  Sheet 1 of 2

INVENTOR
HENRY HARRISON
BY Cushman, Darby & Cushman
ATTORNEYS

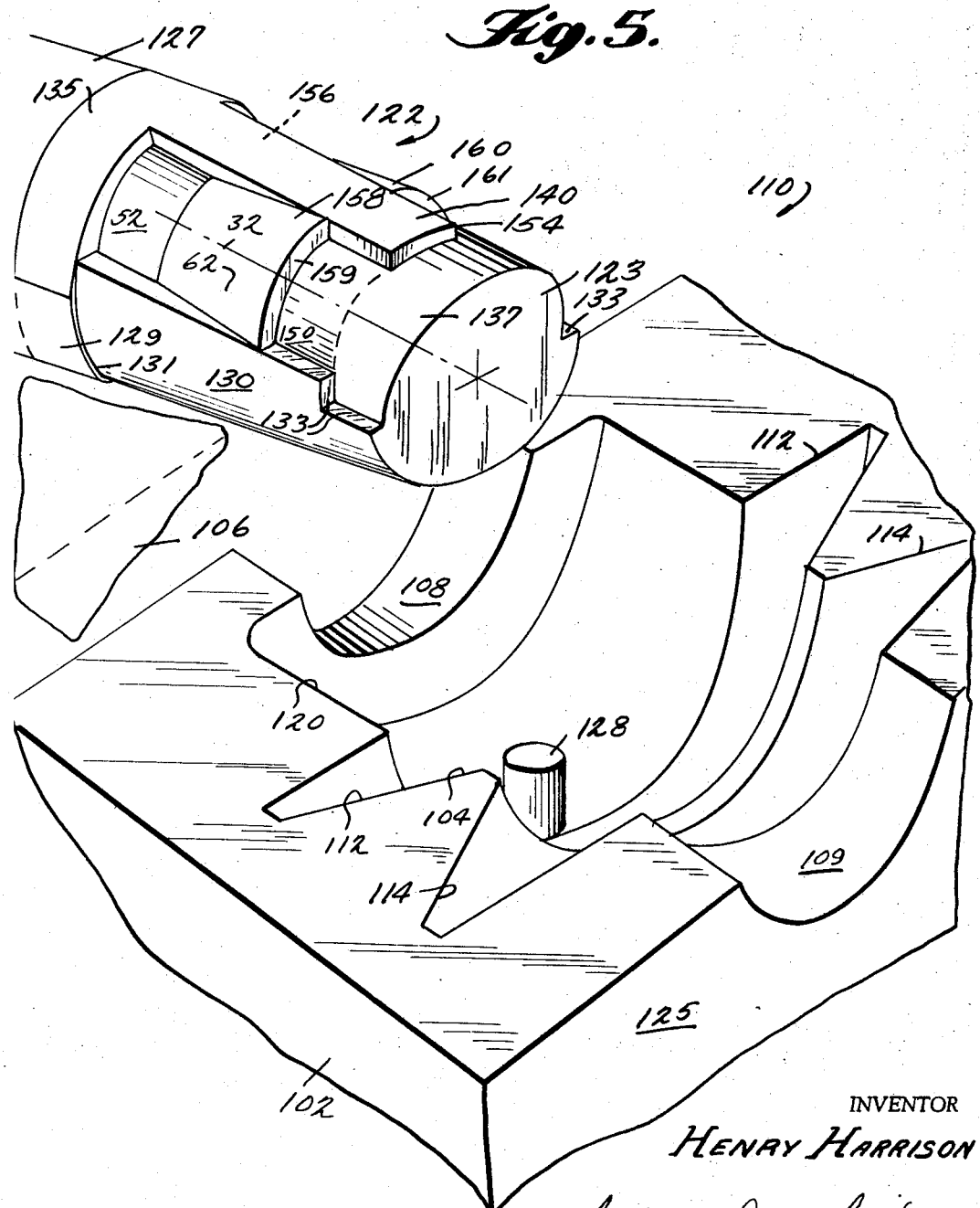

United States Patent Office 3,424,483
Patented Jan. 28, 1969

3,424,483
ROTATABLE ELEMENT
Henry Harrison, 18 Frost Creek Drive,
Locust Valley, N.Y. 11560
Filed Oct. 7, 1965, Ser. No. 493,790
U.S. Cl. 287—52.08    2 Claims
Int. Cl. B60b 27/06; F16d 1/06; F16c 3/10

ABSTRACT OF THE DISCLOSURE

The rotatable element has a multi-point mounting including a plurality of axially spaced pairs of arcuately spaced cylindrically curved shaft engaging pads in the radially inward peripheral surface of the element and a radially movable fastener in the element substantially diametrically opposed to the longitudinally directed symmetry line of said pads. An arcuately extending recess is provided facing radially inwardly between the shaft engaging mounting pads of the element in order to forestall rocking of the rotatable element on its shaft. The element may be cast in a two part mold having a core, and the core withdrawn at an oblique angle to free it from the casting.

---

Figure 1:
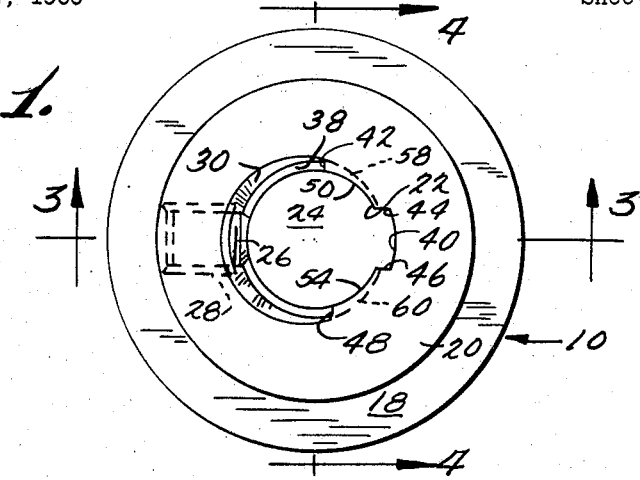

The present invention relates to shaft carried rotatable elements such as pulleys and more particularly to a hub having improved stability during its rotation for preventing its rocking or shaking on the shaft and so becoming loosened, and to a method for making such improved hubs.

In the conventional fabrication and assembly of precision gears, collars and the like, the hub is reamed or bored to very close tolerances sometimes as close as ±.0001 inch and the hole is finished to a very fine finish, say 8 microinches RMS, which may require honing or the like. The shaft must also be finished to a similar precision, and it is not uncommon to find designs where the whole length of the shaft is held to this precision. However, it has been the practice to leave an enlarged portion of the shaft which can be finely and accurately finished, where the gear must fit. The high degree of finish is necessary to allow the two parts to slide together without undue clearance which would introduce eccentricity errors. Once the gear or collar is in place, it may be clamped by a set screw, and then locked by pinning. This whole procedure is very expensive, and is irreversible since once set, the gear cannot be relocated.

Pulleys or similar rotatable elements which have cylindrically bored or otherwise formed central openings for mounting the elements on shafts often tend to develop bell mouths at both axial ends of the bore so that they only firmly engage the shaft centrally of the bore with a convex surface. Within a range of rotational speeds which depends on the curvature of this surface, the dynamic balance of and load upon the rotatable element as well as its mass and other factors, such elements will wobble or rock on the shaft and so tend to loosen the set screw or other clamping means. This causes the element to shake and emit an annoying chattering noise and eventually the clamping means will fail and the element shake free from the shaft.

Summary of the invention

A rotatable element having means defining a longitudinal bore; clamping means on said element protrudable into said bore generally radially thereof for clamping said rotatable element on a shaft; said bore defining means including four axially and arcuately spaced surface portions concavely cylindrically curved about the longitudinal axis of said bore and adapted to supportingly bear on said shaft; said bore being axially and radially relieved throughout a band of arcuate extent of more than 180 degrees substantially centered on said clamping means; said bore also being axially and radially relieved in a narrower band substantially diametrically opposite said clamping means, two of said surface portions lying arcuately between the first-mentioned and narrower bands in both arcuate senses; and said bore being radially relieved in two bands extending arcuately between the first-mentioned and narrower bands and between axially spaced ones of said surface portions, said bands being so oriented with respect to said surface portions as to render said bore defining means castable by generally longitudinally withdrawable, unitary coring.

Accordingly, there is provided according to the present invention a rotatable element having a multi-point mounting including a plurality of axially spaced pairs of arcuately spaced cylindrically curved shaft engaging pads in the radially inward peripheral surface of the element and a radially movable fastener in the element substantially diametrically opposed to the longitudinally directed symmetry line of said pads.

Another object of the invention is the provision in a rotatable element of the character described of an arcuately extending recess, radially inwardly facing recess between the shaft engaging mounting pads of the element in order to forestall rocking of the rotatable element on its shaft.

A further object of this invention is the provision of a method whereby such a rotatable element can be cast from metal or the like using a two part mold and a unitary core. Ancillary to the last-mentioned object is the provision in the method for withdrawing the core at an oblique angle to the longitudinal axis of the rotatable element cast in order to free the core from the undercut surface between the axially spaced pairs of mounting pads.

Yet another object of the invention is the provision of a novel core for forming the bore of the rotatable element.

The term "bore" as employed in this specification is intended to refer to the central, longitudinally directed opening through the rotatable element rather than to a machining process for forming the opening.

The aforementioned as well as other objects of the present invention, its principles and broad scope of applicability will become more evident during the course of the following detailed explanation relating to a preferred embodiment of the invention, a pulley which is illustrated in the annexed drawings. It should be borne in mind throughout the entire course of the explanation that the invention is equally applicable to other rotatable elements such as gears, friction wheels, cams, flywheels, thrust collars and the like.

Figure 2:
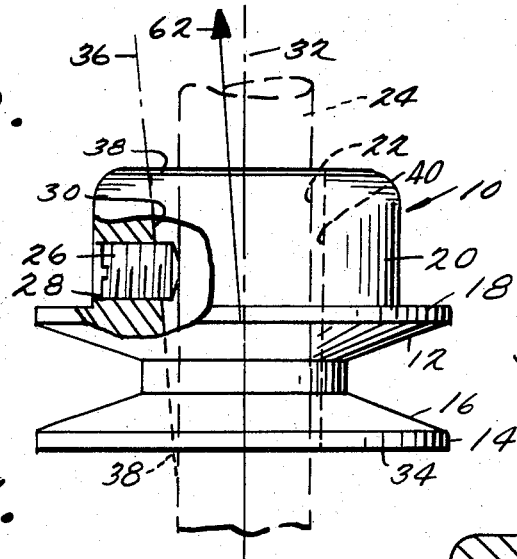
Figure 3:
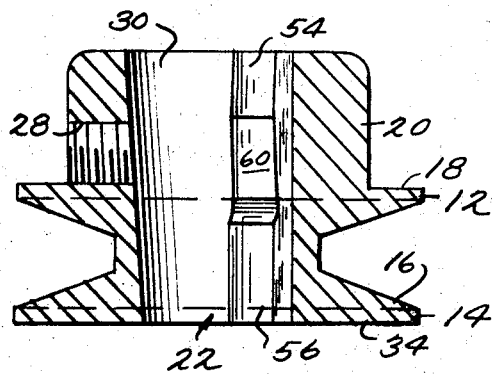
Figure 4:
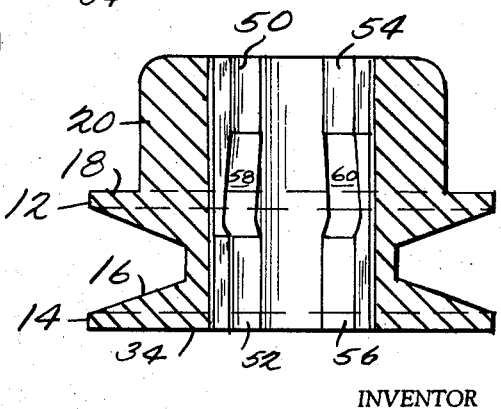

In the drawings:
FIGURE 1 is an end elevation view of a pulley embodying the principles of the present invention;
FIGURE 2 is a side elevation view of the pulley of FIGURE 1, shown mounted on a shaft;
FIGURE 3 is a sectional view taken along line 3—3 of FIGURE 1;
FIGURE 4 is a sectional view taken along line 4—4 of FIGURE 1; and
FIGURE 5 is an exploded fragmentary perspective view of a mold and core for casting the pulley of FIGURES 1–4 according to the present invention.

The pulley 10 is shown having two axially spaced, radially outwardly extending annular flanges 12 and 14 which define a radially outwardly flared channel 16 between them for receiving a V-belt (not shown) or the like. From the face 18 of the flange 12 integrally and coaxially extends a set screw collar 20. A central axially directed bore 22 through the pulley, including through the set screw collar is utilized to removably or permanently mount the pulley 10 on a shaft 24 using means such as a set screw 26 threadably received in a radially directed threaded opening 28 in the collar 20. The opening 28 communicates at its radially outer extent with the exterior of the pulley 10 and at its radially inner extent with the bore 22.

The bore 22 is not merely defined by a cylindrically curved peripheral, straight line element, surface as are conventional pulleys since this would produce the vibration and loosening and shaking free of the pulley from the shaft as aforedescribed.

Instead thereof, the bore is significantly conically relieved at 30, the surface 30 having its axis of curvature coincident with the longitudinal axis 32 of the bore 22 and shaft 24 and its apex considerably beyond the outer face 34 of the flange 14 so that, if extended, the surface 30 at its longitudinally directed centerline element 36 would intersect the shaft 24 somewhat beyond the outer face 34 of the flange 14. The centerline 36 is shown extending at 5 degrees to the bore axis 32. Accordingly, a small gap 38 is provided between the outer periphery of the shaft 24 and the surface 30 of the bore 22. The gap 38 extends axially the length of the bore 22 and arcuately throughout somewhat more than 180 degrees, being arcuately centered on the line 36 which extends through the center of the juncture of the opening 28 with the bore 22. In FIGURE 1, the surface 30 is shown extending arcuately approximately 195 degrees. Opposite the surface 30 the bore 22 is cylindrically enlarged at 40 about an axis coincident with the bore axis. The groove 40 extends longitudinally the length of the bore 22 and arcuately approximately 50 degrees, having its longitudinal centerline diametrically opposite the surface 30 centerline 36.

Arcuately between the arcuate ends 42 and 44 of the surface 30 and groove 40 respectively and 46 and 48 of the groove 40 and surface 30 respectively are formed four mounting pads 50, 52, and 54, 56 respectively. Each of the pads has a cylindrically curved radially inwardly facing surface which has a radius of curvature that is substantially identical to that of the shaft 24 outer peripheral surface and a center of curvature substantially identical to that of the shaft 24.

The arcuately spaced pair of pads 50 and 54 are axially spaced respectively from the pads 52 and 56 by elliptic cylindrically bottomed recesses 58 and 60 whose elements are all substantially parallel to an oblique core withdrawal axis 62 to be more fully described hereinafter. The surfaces 58 and 60 are mirror images of one another, as are the other features of the pulley 10, about the cutting plane 3—3 of FIGURE 1 which constitutes a plane of symmetry for the pulley 10.

When the pulley 10 is placed on the shaft 24 and the set screw 26 threaded inwardly until it tightly engages the shaft, the pulley 10 is mounted with a five point support including the pads 50, 52, 54 and 56 and the inner end of the set screw 26 so that it is concentric with the shaft. Because a majority of the support area is located adjacent the axial ends of the bore 22 and because the pulley does not engage the shaft centrally of the bore 22, the tendency of the pulley to rock, form bell mouths and shake free of the shaft has been effectively eliminated. Yet, inasmuch as the pads are of sufficient arcuate extent and because they are substantially arcuately spaced the support they provide is very stable.

Another advantage flowing from the structure just described is that the pulley 10 can be loosened, taken off the shaft and put back on again and secured in place without losing concentricity with the shaft 24. In conventional pulleys having substantially smooth cylindrical bores, after the pulley securement device such as a set screw has once marred the shaft surface it is difficult, if not impossible, to ever replace the pulley on the shaft in a concentric condition since the marred surface will interfere with the bore peripheral surface if the set screw is not placed exactly at the point on the shaft where it had been before removal. In the pulley according to the present invention this is obviated because of the arcuately and longitudinally wide gap between the bore 22 and the shaft 24 in the region of the set screw 26.

As a further consideration heat produced by frictional contact of a V-belt or the like with the pulley may be dissipated more rapidly than is the case with conventional pulleys because of air flow through the longitudinally and arcuately extending gap between the pulley and the shaft as aforedescribed. As a result of the faster heat dissipation, the pulley 10 may work at a lower steady state operating temperature than conventional pulleys.

FIGURE 5 shows a three part mold 110 for die casting the pulley 10. The mold half 106 not shown completely is identically complementary to the mold half 102 more completely shown but for difference in curvature of the mold seal area, presence of a conventional sprue and the absence of a set screw core as will be described.

The mold half 102 has a cavity 104 adapted to mold one half of the exterior of the pulley 10, the other mold half being securable in a cavity to cavity relationship to the mold half 102 after the core 122 which will form the bore 22 has been positioned within the cavity, between the halves.

The cavity 104 includes arcuate recesses 112 and 114 for forming the pulley flanges 12 and 14 and an arcuate recess 120 for forming the set screw collar 20. The recess 120 is interrupted intermediate its axial and arcuate extent by a radially inwardly directed substantially cylindrical core 128 used to core the opening 28 which is subsequently tapped to receive the set screw 26. The conically curved core engaging seal surfaces 108 and 109 adjacent and leading to opposite ends of the mold half 102 are surfaces of revolution with respect to the oblique core withdrawal axis 62, the apex of the surfaces 108 and 109 being rightwardly from FIGURE 5.

The core 122 generally comprises a truncated core having an outer end 123 adapted to be flush with the end 125 of the mold when the mold and core are in an assembled condition. Proceeding from the root 127 of the core 122 along the lower half of the core, the peripheral band 129 extends arcuately 180 degrees and is adapted to coextensively engage the mold cavity sealing surface 108 in surface to surface engagement. At the rightmost axial edge of the band 129, the core undergoes a slight radial reduction forming a shoulder 131 which is radially aligned with the leftmost edge of the cavity recess 120 when the mold and core are assembled. The surface 130 of the core leading to the end 123 of the core is substantially coextensive with and the reverse in curvature of the surface 30 of the bore 22 before described. It will be recalled that the surface 30 arcuately extends for approximately 195 degrees, however the surface 130 when reaching a point radially aligned with the rightmost edge of the cavity recess 114 undergoes a sharp cutback in arcuate extent to 180 degrees. The arcuately radially and axially directed planar shoulders 133 defining the arcuate extent of the surface 130 beyond the cavity recess rightmost edge are substantially parallel to, and adapted to be flush with, the parting plane of the mold. The portion of the surface 130 extending under the core between the shoulders 133 comprises a sealing surface adapted to engage the surface 109 of the mold half 102 in coextensive sealing engagement.

Turning now to the upper half of the core 122 and proceeding from the root 127, the peripheral band 135 extends between and merges in a narrow horizontal planar step, with the arcuate ends of the band 129. The band 135 is cylindrically curved about an axis coincident with the bore 22 longitudinal axis 32. The mold upper half has a curved surface (not shown) which is adapted to coextensively sealingly engage the surface 135. At its arcuate midpoint the band 135 has a longitudinally directed cylindrically curved extension 140 having the reverse curvature of the groove 40 of the bore 22 which it forms. The extension 140 terminates in longitudinal alignment with the arcuate portions of the shoulders 133. The surfaces 150, 152, 154 and 156 are pad molds for forming the pads 50, 52, 54 and 56 respectively. These surfaces are cylindrically curved about an axis coincident with the axis 32.

The band 137 which is as axially wide as the band defined in the lower half of the core arcuately between the shoulders 133 and extends between the shoulders 133, is an extension of the pad mold surfaces 150 and 154. This band is adapted to engage a substantially identical but reversely curved surface (not shown) of the upper mold half in surface to surface sealing engagement.

The surfaces 158 and 160 are elliptically cylindrically curved, having all their elements at least substantially parallel to the core withdrawal surfaces. These surfaces 158 and 160 may be made slightly conical to provide a draft angle. Accordingly, arcuate radially directed steps 159 and 161 form the rightmost ends of the recesses 58 and 60 adjacent the pads 50 and 54, the axially opposite ends of the surfaces 158 and 160 meeting the pads 52 and 56 at a low angle. The recesses formed in the central region of the bore by the surface 130, surfaces 158 and 160 and the extension surface 140 ensure that the pulley will not engage the shaft in this central region which extends completely around the bore 22.

In order to cast a pulley 10, the core 122 is placed in the mold lower half in the orientation described and the mold upper half lowered thereon until its lower planar surface engages the upper planar surface of the mold lower half. The mold halves are then secured to one another and molten metal or the like introduced into the mold cavity by conventional casting techniques. Alternatively, the core 122 may be inserted after the mold halves are assembled. As is conventional, the mold and core may first have been coated with a parting composition.

Any flash from the molten molding composition takes place outwardly from the pulley at the stepped transitions from cylindrical to conical curvature at the parting planes of the sealing surfaces of the mold halves, and thus may be easily trimmed from the casting.

The cast pulley and the mold are then cooled or allowed to cool and the mold halves separated. Because of the configuration of the core aforedescribed it can be withdrawn leftwardly when oriented as shown, from the bore 22 by pulling it parallel to the oblique axis 62 while holding the pulley stationary.

It should now be apparent that the shake-free pulley and its undercut forming one-piece withdrawable core as described fully and efficiently accomplish each of the invention's objects as set forth hereinbefore and will illustrate its principles and scope of applicability. Inasmuch as the embodiments shown can be considerably modified without departing from these principles or failing to accomplish these objects the present invention should be interpreted as encompassing all such modifications as are within the spirit and scope of the following claims.

I claim:

1. A rotatable element having means defining a longitudinal bore; clamping means on said element protrudable into said bore generally radially thereof for clamping said rotatable element on a shaft; said bore defining means including four axially and arcuately spaced surface portions concavely cylindrically curved about the longitudinal axis of said bore and adapted to supportingly bear on said shaft; said bore being axially and radially relieved throughout a band of arcuate extent of more than 180 degrees substantially centered on said clamping means; said bore also being axially and radially relieved in a narrower band substantially diametrically opposite said clamping means, two of said surface portions lying arcuately between the first-mentioned and narrower bands in both arcuate senses; and said bore being radially relieved in two bands extending arcuately between the first-mentioned and narrower bands and between axially spaced ones of said surface portions, all said bands being so oriented with respect to said surface portions as to render said bore defining means castable by generally longitudinally withdrawable, unitary coring.

2. In combination: a generally cylindrical shaft; an annular collar having means defining a generally cylindrical bore longitudinally and coaxially therethrough; said collar carried on said shaft via said bore defining means, means defining a radially directed opening in said collar communicating with said bore, means defining a first relief in said bore in longitudinal alignment with the longitudinal axis of said shaft and extending the length of said bore, said relief intersecting the juncture of said opening and said bore thereby defining a first gap between said collar and said shaft, said gap extending arcuately throughout at least 180 degrees of said bore, a plurality of arcuately spaced support pads in said bore adjacent one end thereof and arcuately non-coextensive with said first gap, a plurality of arcuately spaced support pads in said bore adjacent the opposite end thereof from said one end and arcuately non-coextensive with said first gap, means defining a cylindrically curved radially inner surface on each of said support pads, said surface having a radius of curvature and a center of curvature substantially equal to those of said shaft; a threaded element threadably received in said opening and threadably movable radially inwardly therein into engagement with said shaft to secure said collar on said shaft; the bore additionally including means defining a radially inwardly facing longitudinally directed groove diametrically opposite said juncture of said opening and said bore, said support pads being in longitudinal and arcuate alignment on either side of said groove; said first relief being defined by a conical surface having the apex thereof without and beyond said bore one end; and means defining a recess in said bore between each support pad which is adjacent said bore one end and each support pad which is adjacent said bore other end, each recess being of greatest depth adjacent the axially inner end of each support pad which is adjacent said bore one end and merging with the axially inner end of each support pad which is adjacent said bore other end, and each recess being defined by an elliptical cylindrical surface having all elements thereof parallel to an imaginary longitudinally directed line on said conical surface bisecting said opening to thereby facilitate coring said bore and facilitating core withdrawal along an axis parallel to said line.

References Cited

UNITED STATES PATENTS

| 212,028 | 2/1879 | Mast | 287—52 |
| 221,466 | 11/1879 | Klein | 287—52 |
| 766,125 | 7/1904 | Williams | 287—52.08 X |
| 780,850 | 1/1905 | Williams | 287—52.08 |
| 1,264,594 | 4/1918 | Barry | 287—52.08 |
| 2,893,764 | 7/1959 | Ferguson | 287—53 |

FOREIGN PATENTS

| 407,896 | 3/1910 | France. |
| 961,083 | 11/1949 | France. |

CARL W. TOMLIN, *Primary Examiner.*

D. W. AROLA, *Assistant Examiner.*

U.S. Cl. X.R.

164—30; 249—142